United States Patent [19]

Heynacher

[11] Patent Number: 4,606,151

[45] Date of Patent: Aug. 19, 1986

[54] METHOD AND APPARATUS FOR LAPPING AND POLISHING OPTICAL SURFACES

[75] Inventor: Erich Heynacher, Heidenheim, Fed. Rep. of Germany

[73] Assignee: Carl-Zeiss-Stiftung, Heidenheim, Fed. Rep. of Germany

[21] Appl. No.: 673,864

[22] Filed: Nov. 21, 1984

[30] Foreign Application Priority Data

Aug. 18, 1984 [DE] Fed. Rep. of Germany ....... 3430499

[51] Int. Cl.$^4$ ............................................. B24B 13/00
[52] U.S. Cl. ....................................... 51/62; 51/283 R
[58] Field of Search ............ 51/58, 62, 284 R, 283 R, 51/DIG. 34, 141, 325

[56] References Cited

U.S. PATENT DOCUMENTS 2,399,924  5/1946  Hayward ................................. 51/58
3,167,889  2/1965  Jacobi .................................... 51/141

FOREIGN PATENT DOCUMENTS 3328398  8/1983  Fed. Rep. of Germany ........ 51/141
553623   9/1974  Switzerland ............................ 51/141

Primary Examiner—Frederick R. Schmidt
Assistant Examiner—Maurina Rachuba
Attorney, Agent, or Firm—Walter Ottesen

[57] ABSTRACT

The invention is directed to a method and apparatus for lapping and polishing preferably larger aspheric mirrors such as for astronomical telescopes. The apparatus is in the form of a membrane covering the entire surface to be polished. On the rearward face of the membrane, a plurality of actuators are arranged close to one another and have pressure forces which are individually adjustable. The actuators are stationary relative to the workpiece or perform only small oscillatory movements when compared to the stroke of the lapping tool. With the aid of the actuators, a pressure distribution can be built up over the workpiece which permits different subareas of the workpiece to be removed in different intensities in a single working step.

12 Claims, 6 Drawing Figures

METHOD AND APPARATUS FOR LAPPING AND POLISHING OPTICAL SURFACES

FIELD OF THE INVENTION

The invention relates to a method and an apparatus for lapping and polishing of optical surfaces which are preferably aspheric such as mirrors for astronomical telescopes.

BACKGROUND OF THE INVENTION

The lapping and polishing of large aspheric astro-mirrors is a very time consuming task since it is most difficult to obtain the exact form of the mirror with the accuracy over the entire mirror surface of fractions of the wavelength required for observing in the optical spectral range. Such fractions of the wavelength can typically be 10–50 nm RMS.

One usually proceeds by first lapping and polishing a spherical surface whereby a radius of curvature is selected which comes closest to the desired aspheric surface. Thereafter, the aspheric deformation is polished into the mirror with tools that are very much smaller than the mirror surface.

This polishing work is continuously interrupted by interferometric tests in which remaining residual errors are detected. The closer one comes to the objective, the more the work shifts from the removal of rotational symmetrical errors to the removal of nonsymmetrical local residual errors.

An article entitled "Segmented Mirror Polishing Experiment" in the publication "Applied Optics", Volume 21, Number 3 (1982), pages 561–564 discloses that the described process can be partially automated in that the tool is computer-control guided over the surface to be observed such that the dwell time of the tool varies at different locations of the surface and is dependent upon the material to be removed from said locations.

However, with this method, the different subareas of the workpiece are sequentially worked by means of a relatively small tool thereby making the processing time very long.

Furthermore, it is very difficult to work the edge portions of the workpiece with this method since the working action of the tool in these regions is very irregular.

SUMMARY OF THE INVENTION

It is therefore an object of the invention to provide a method and an apparatus with which also large and especially aspheric surfaces can be worked relatively quickly and with a precision required for the optical elements. The method should permit an automatically controlled processing.

In the method of the invention of lapping or polishing optical surfaces including aspherical surfaces, the optical surface to be lapped or polished is first measured and the lapping or polishing steps are controlled in correspondence to the form deviations of the actual form of the surface from a predetermined desired form. The method includes the steps of: laying down a lapping or polishing tool in the form of a flexible membrane upon substantially the entire surface to be processed; applying a pressure distribution corresponding to the deviations to the side of the membrane facing away from the surface; moving the membrane over the surface by means of forces which act substantially tangentially thereby substantially maintaining the pressure distribution relative to the surface; and, stopping the movement of the membrane and measuring the surface again to determine if the removed material V corresponding to the measured deviations between the actual form and the desired form has been obtained, the removed material being computed from the product of the pressure P, processing time t, and relative velocity v between the membrane and the surface.

The invention achieves a drastic reduction of the processing time required for lapping and polishing astro optics by utilizing a tool which processes the entire surface simultaneously. Nevertheless, deviations from the required form at various locations are easily polished away because the removal of material is controlled by means of a computer-adjusted pressure distribution which is applied to the rearward side of the tool. Since the processing membrane which is moved has only a comparatively low mass, high relative velocities between the tool and the workpiece are obtained whereby the processing time is likewise reduced.

BRIEF DESCRIPTION OF THE DRAWING

The invention will now be described with reference to the drawing wherein.

DESCRIPTION OF THE PREFERRED EMBODIMENTS OF THE INVENTION

Figure 1:
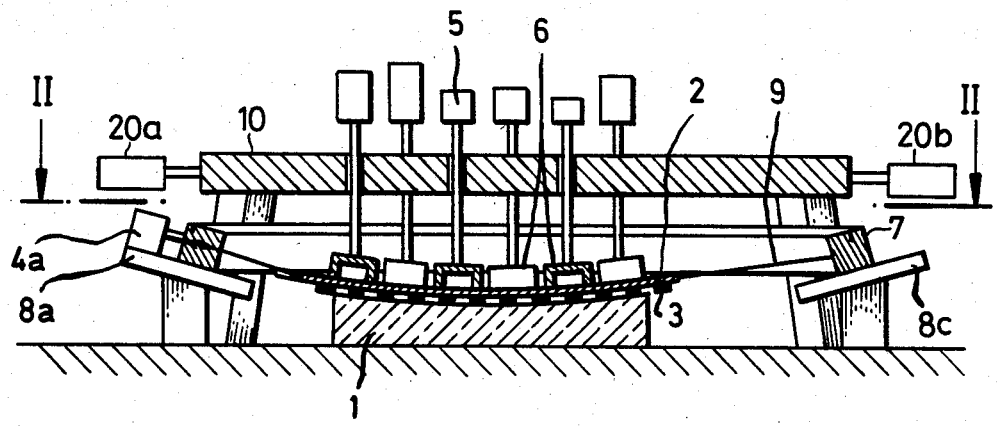
FIG. 1 is a side elevation view, partially in section, taken along line I—I of FIG. 2 and shows the lapping and polishing tool according to the invention.
Figure 2:
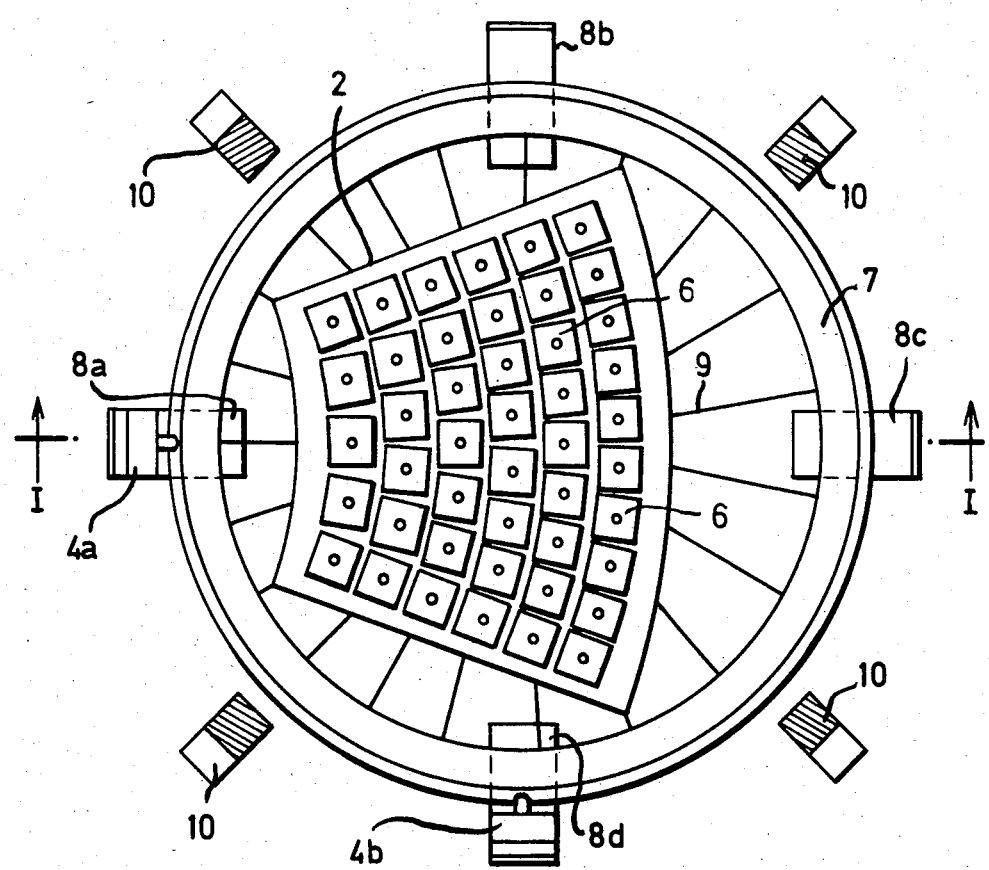
FIG. 2 is a plan section view taken along line II—II of FIG. 1.

The lapping and polishing tool shown in FIGS. 1 and 2 processes the surface of a workpiece 1 positioned at a fixed location. For the embodiment of the lapping and polishing tool shown, the workpiece is in the form of a concave aspheric circular annular segment.

The lapping and polishing tool is essentially made up of a thin elastic plate 2 which is laid upon the workpiece 1. This plate 2 has substantially the same dimensions as the workpiece 1; however, it also can be somewhat larger or smaller. At its lower surface, the plate 2 carries the lapping and polishing base consisting of a plurality of individual lapping or polishing pads 3.

The thickness of the elastic plate 2 which will be hereinafter referred to as a membrane is dependent upon the size of the workpiece 1 and, with mirror dimensions of approximately 4 meters, can amount to several centimeters. Aluminum is a material which is suitable for the membrane 2; however, other materials such as plastic, for example, are also suitable.

The membrane 2 is gently held in a ring-shaped frame 7 in the axial direction of mirror 1 by means of adjustable tensioning elements in the form of steel ropes 9. The frame 7 is mounted upon four guides 8a to 8d which are exactly adjusted according to position and angle. The frame 7 and therefore the membrane 2 which is tension-held therein are placed in an oscillatory movement free of transverse forces by two drives 4a and 4b arranged with respect to guides 8a and 8d. The amplitude and frequency of the oscillatory movement are determined by means of a computer (not illustrated).

On the rearward side of the membrane 2 facing away from the workpiece 1 are a plurality of loading units 5 arranged closely one next to the other. Each loading unit 5 is braced with individually adjustable forces on the membrane 2 via air bearing 6.

In lieu of an air bearing, another type of suitable low friction bearing 6 can be utilized such as a water-pressure hydrostatic bearing. The bearing identified by reference numeral 6 in FIG. 3a also serves to represent the hydrostatic bearing in which case the arrow 6a adjacent the entry port 6b in FIG. 3a represents incoming water under pressure.

In the following, the loading units 5 will be referred to as actuators. The actuators 5 are held by a bridge 10 positioned at a fixed location just as the workpiece 1. The actuators 5 are shown in FIGS. 3a and 3b and permit a pressure distribution to be developed during the lapping process which is stationary relative to the position of the workpiece 1; that is, each point of the surface of the workpiece to be processed is assigned a predetermined processing pressure by means of which the desired amount of material to be removed can be individually adjusted at the corresponding position. The air bearings 6 ensure a uniform loading of the membrane surface assigned to each actuator 5.

Figure 3A:
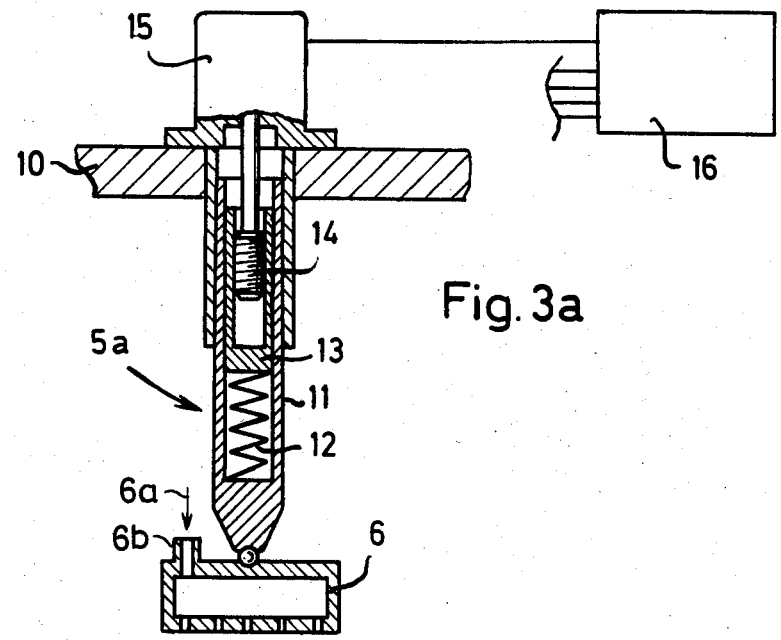
FIG. 3a is a detailed schematic representation of one of the actuators 5 shown in FIG. 1.
Figure 3B:
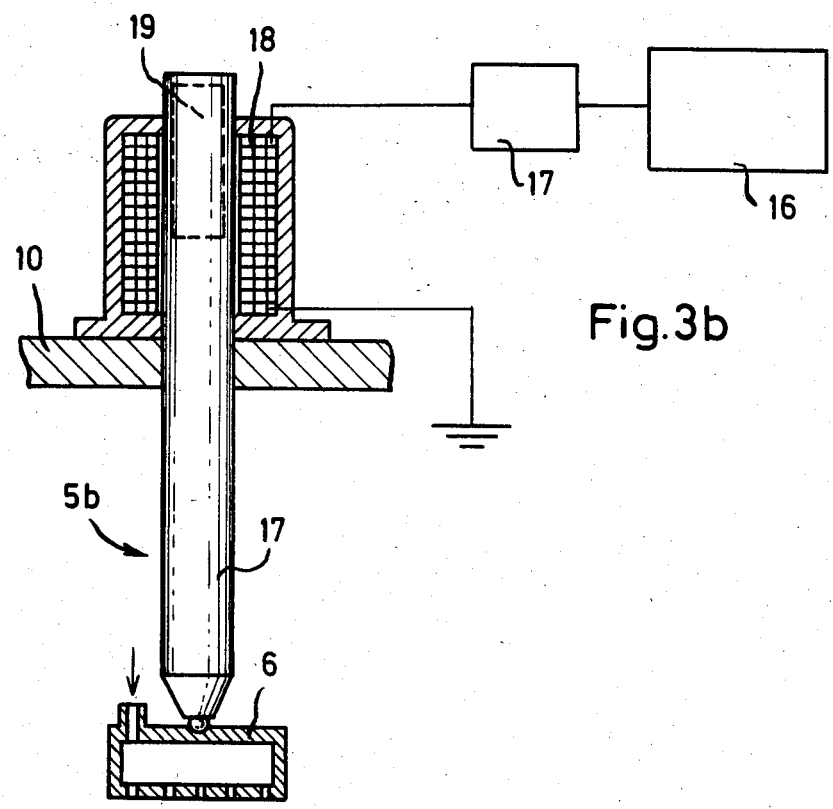
FIG. 3b is a schematic representation of an alternate embodiment of an actuator 5 of FIG. 1.

The actuator 5a shown in FIG. 3a is made up of a cylindrical sleeve 11 slideably journalled in the bridge 10 and braced upon the air bearing 6. A spring 12 disposed inside the sleeve 11 can be pressed together by a cylinder 13 linearly guided in the sleeve 11. The cylinder 13 is driven by a threaded spindle 14 along the axis of a motor 15 fixedly mounted on the bridge 10. The motor 15 is controlled by a computer 16 in the same manner as the remaining actuators which are not illustrated. The motor 15 adjusts the force with which the spring 12 presses against the air bearing 6 before the lapping process is begun. Because of the self-locking effect in the spindle 14, the motor 15 can remain deenergized after the processing pressure is set.

In lieu of the actuator 5a described above, the actuator 5b shown in FIG. 3b can be utilized wherein a simpler configuration is provided. The rod 17 of the actuator 5b braced on the air bearing 6 and guided in the bridge 10 is provided with a permanent magnet 19 at its upper end. The permanent magnet 19 is surrounded by a coil 18 fixedly positioned on the bridge 10. In this way, the desired pressure is therefore generated in the manner of a plunge-coil drive.

As shown in FIG. 1, a plurality of individual pads 3 are disposed on the lower side of the membrane 2. Space is provided between the pads to accommodate the processing liquid which is injected laterally and drawn away by suction at the lowest location. When processing axially symmetrical mirrors with a central bore as commonly used in astronomy, it is practical to draw away the polishing liquid by suction through the central bore of the mirror.

The lapping and polishing method according to the invention is conducted with the aid of the apparatus of the invention disclosed with reference to FIGS. 1 to 3 in the manner described below.

First the deviations of the coarsely processed surface of the workpiece 1 from its desired form are determined in a known manner such as by means of interferometric testing methods. The surface of the workpiece 1 can be spherical for example.

Thereafter, the pressure distribution is computed by computer means from the form deviations which are to be removed. This pressure distribution leads to the desired result by predetermined lapping or polishing speeds during a predetermined processing time. For this computation, the relationship of F. W. Preston can be utilized whereby the volume of material V to be removed is approximately proportional to the product of the workpiece surface F, surface pressure P, the processing time t and the relative velocity v between workpiece and tool. In this connection, reference may be made to the article of F. W. Preston entitled "The Theory and Design of Plateglass Polishing Machines" in the Journal of the Society of Glass Technology, Volume XI, Number 42 (1927), pages 214 to 256. According to the latter, the material removed by the membrane 2 under each of the actuators 5 is proportional in a first approximation to the force with which the actuator 5 presses the membrane 2 on the particular location on the surface of the workpiece 1. The force is therefore individually adjustable, for example, as a predetermined digital current value for the supply unit 17 of the actuator 5b illustrated in FIG. 3b. In this way, locally different material removals can be obtained although the entire surface of the workpiece is processed simultaneously by means of a single tool.

In addition, it is possible to laterally move the actuators together with their support 10 by an amount which is small in comparison to the amplitude of the membrane movement. In this way, the actuators are prevented from impressing the workpiece which, for example, could occur if the stiffness of the membrane 2 was selected to be relatively small. Ancillary drives 20a and 20b impart this additional movement to bridge 10.

When the computer-determined processing time has run out after which the workpiece 1 should have reached its final form, the working process is stopped and the workpiece is again measured. During this measurement, the workpiece can be again prepared for the follow-on lapping process.

Figure 5:
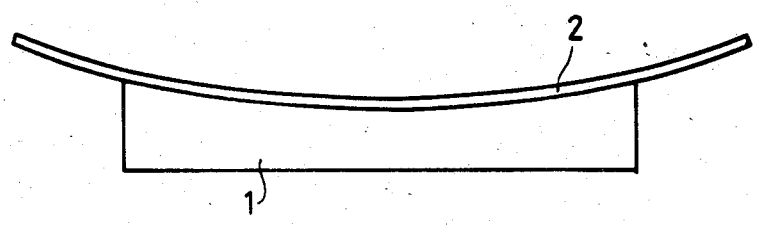

The membrane 2 is relaxed for a new preparation; that is, the membrane is pressed upon a spherical impression tool which comes as close as possible in its form to the workpiece 1 to be processed or is pressed directly upon the workpiece as shown in FIG. 5. To accelerate this impression process, a pressure distribution is applied to the membrane 2 via the actuators 5 which is opposite when compared to the previously conducted lapping or polishing step. If the membrane is pressed upon the workpiece itself, its dimensions correspond to the workpiece surface. During processing, it is in this case purposeful to dynamically control the actuators which are arranged on the periphery. It is always then purposeful to remove load from the actuators when the membrane is pulled away from underneath said actuator as part of the polishing movement. This is not necessary if a separate impression tool is worked with. In this case, the membrane and the impression tool can be greater with respect to their dimensions so that the surface to be lapped in each phase of the membrane movement is covered by the latter.

Figure 4:
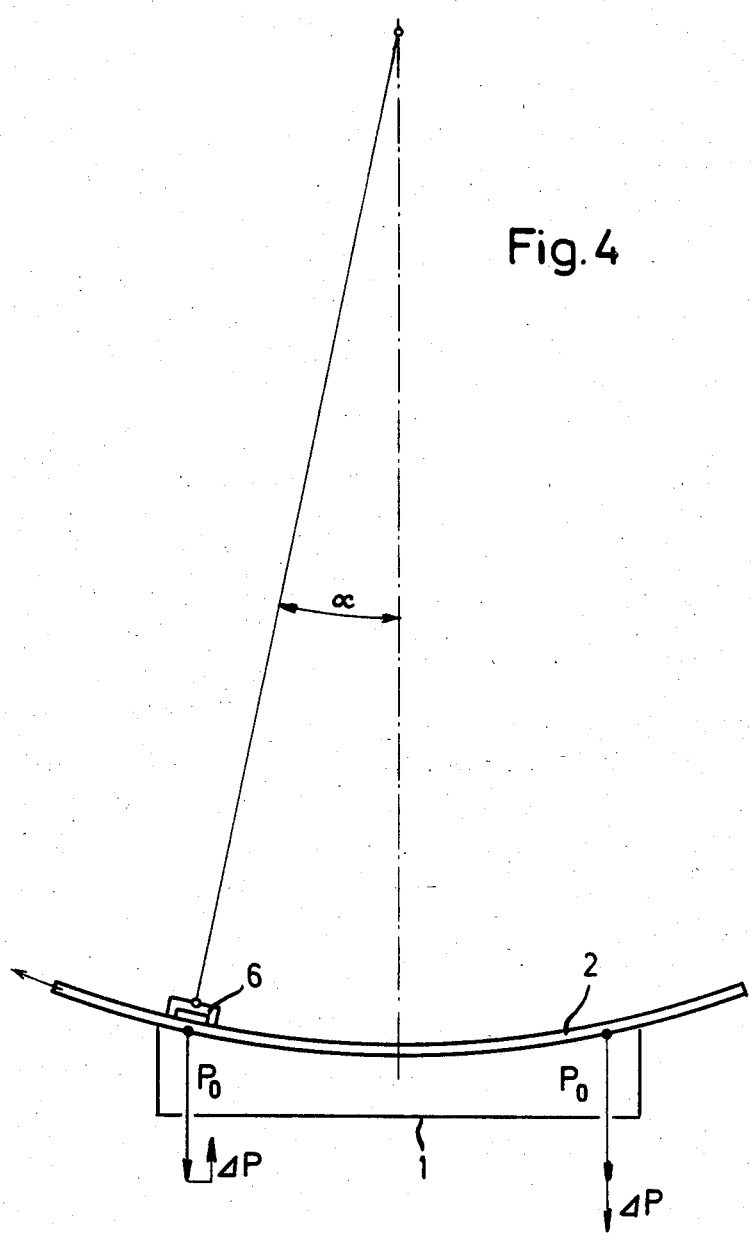
FIG. 4 is a schematic representation of the dynamic forces which occur during operation of the lapping and polishing tool shown in FIGS. 1 to 3; and, FIG. 5 is a schematic showing the membrane directly upon the workpiece according to a step of the method of the invention.

In the previously described method of lapping and polishing according to the invention, the ideal case was assumed that by means of the polishing movement of the membrane 2, only different forces dependent upon location are applied which act in the plane of the workpiece surface. Since the surface of the workpiece 1 is however curved, there occur pressure forces ΔP because of the frictional forces acting between the membrane and the workpiece which are superimposed on the forces P (see FIG. 4) adjusted at the actuators 5. The forces ΔP act subtractively on the side of the membrane which is pulled and additively on the other side. Since with an oscillatory movement, the pulling side continuously alternates, this effect is not critical so long as the forces ΔP are smaller than the smallest processing force $P_{min}$. However, the effect influences the applied dynamic of the polishing pressures since it determines the order of magnitude of the smallest polishing pressure $P_{min}$. The magnitude of the effect is a function of the angle of inclination α and therewith of the aperture ratio of the workpiece. With large aperture ratios of the mirror surface of the workpiece 1 larger than approximately F/1.0, it is purposeful to provide a computer controlled dynamic compensation with which the forces of the actuators 5 are corrected by an amount dependent upon the amplitude and direction of the instantaneous lapping movement. For this purpose, relatively fast reacting actuators according to FIG. 3b are especially well suited.

The workpiece illustrated in FIG. 1 has the form of a circular ring segment. Of course, it is also possible with the means disclosed herein to process rotationally symmetrical workpieces such as one piece mirrors for astronomical telescopes. With rotationally-symmetrical workpieces, at least in the initial phase of the processing, if rotational symmetrical errors are to be removed, it is purposeful to let the workpiece rotate slowly under the membrane about its axis in order to distribute azimuthally the action of individual actuators.

In lieu of the steel ropes 9 for axially gently tensioning the membrane 2, other solutions can be selected. For example, it is possible to taper the edge of the membrane and to laminarly tension the same in the frame.

It is understood that the foregoing description is that of the preferred embodiments of the invention and that various changes and modifications may be made thereto without departing from the spirit and scope of the invention as defined in the appended claims.

What is claimed is:

1. Method of lapping or polishing optical surfaces of optical workpieces including aspherical surfaces wherein the optical surface to be lapped or polished is first measured and the lapping or polishing steps are controlled in correspondence to the form deviations of the actual form of said surface from a predetermined desired form, the method comprising the steps of:
   laying down a lapping or polishing tool in the form of a flexible membrane upon substantially all of the surface of the workpiece to be processed;
   applying a plurality of pressure forces to said membrane at a corresponding plurality of locations on the side of said membrane facing away from said surface;
   adjusting said pressure forces individually to obtain a pressure distribution corresponding to said form deviations whereby respectively different removals of material V are obtained at said locations when said membrane is moved;
   imparting an oscillatory movement to said membrane in a predetermined direction transverse to said pressure forces so as to cause said membrane to move relative to the latter and to substantially maintain said pressure distribution relative to said surface thereby effecting said removals of material at respective ones of said locations; and,
   stopping the movement of said membrane and measuring said surface again to determine if the removed material V corresponding to the measured deviations between said actual form and said desired form has been obtained, said removed material V being computed for each of said locations by multiplying together in pressure force P, processing time t, and relative velocity v between said membrane and said surface.

2. The method of claim 1, comprising impressing said membrane onto a separate workpiece between each processing step, said separate workpiece having approximately the desired form of the surface being processed.

3. The method of claim 1, comprising impressing said membrane onto said surface being processed between each processing step.

4. The method of claim 1, wherein said oscillatory movement has an amplitude, the method comprising dynamically controlling said distribution of pressure on said side of said membrane in dependence upon the amplitude and direction of said movement of the latter.

5. The method of claim 1, comprising the step of moving said pressure distribution with small amplitudes relative to said optical surface.

6. Apparatus for lapping or polishing optical surfaces of optical workpieces including aspherical surfaces and wherein a tool is controlled in correspondence to the deviations of the actual form of the optical surface to be processed from its desired form, the apparatus comprising:
   an elastic membrane defining said tool and having a first side and a second side, said membrane having a lapping or polishing base disposed on said first side thereof for engaging said optical surface;
   a plurality of loading devices arranged on said second side of said membrane facing away from said optical surface for applying a plurality of pressure forces to said second side at a corresponding plurality of locations thereon, each of said devices including: a loading unit for applying a pressure force to a subarea of said membrane to press the latter with said base against said optical surface; and, a low friction bearing disposed between said membrane and said loading unit for supporting the latter on said membrane;
   means for adjusting the respective pressure forces of said loading devices individually to obtain a pressure distribution corresponding to said deviations whereby respectively different removals of material are obtained at said locations when said membrane is moved;
   drive means for imparting an oscillatory movement of a predetermined amplitude to said membrane in a predetermined direction transverse to said pressure forces so as to cause said membrane to move relative to the latter and to substantially maintain said pressure distribution relative to said surface thereby effecting said removals of material at respective ones of said locations; and,
   holding means for holding said loading units in a fixed position relative to the movement of said membrane.

7. The apparatus of claim 6, each of said loading units being an electromagnetically controlled actuator.

8. The apparatus of claim 6, each of said loading units comprising: a motor; pressure force application means for applying a pressure force to said membrane through said low friction bearing; and, self-locking gear means for operatively connecting said motor to said pressure force application means.

9. The apparatus of claim 8, said low-friction bearing being a hydrostatic bearing.

10. The apparatus of claim 6, said drive means comprising a frame for holding said membrane under tension therein; and, guide means defining adjustable guide surfaces for guiding said frame in said tangential movement.

11. Apparatus for lapping or polishing optical surfaces of stationary optical workpieces including aspherical surfaces and wherein a tool is controlled in correspondence to the deviations of the actual form of the optical surface to be processed from its desired form, the apparatus comprising:

an elastic membrane defining said tool and having a first side and a second side, said membrane having a lapping or polishing base disposed on a first side thereof for engaging said optical surface;

a plurality of loading devices arranged on said second side of said membrane facing away from said optical surface for applying a plurality of pressure forces to said second side at a corresponding plurality of locations thereon, each of said devices including: a loading unit for applying a pressure force to a subarea of said membrane to press the latter with said base against said optical surface; and, a low friction bearing disposed between said membrane and said loading unit for supporting the latter on said membrane;

means for adjusting the respective pressure forces of said loading devices individually to obtain a pressure distribution corresponding to said deviations whereby respectively different removals of material are obtained at said locations when said membrane is moved;

drive means for imparting an oscillatory movement of a predetermined amplitude to said membrane in a predetermined direction transverse to said pressure forces so as to cause said membrane to move relative to said pressure forces and to substantially maintain said pressure distribution relative to said surface thereby effecting said removals of material at respective ones of said locations;

holding means for holding said loading units with respect to said membrane as it performs said tangential movement; and, ancillary drive means for imparting a lateral movement to said holding means and said loading units, said lateral movement having an amplitude small when compared to said predetermined amplitude of said membrane.

12. The apparatus of claim 11, said ancillary drive means being actuated completely independently of said first-mentioned drive means.

* * * * *

UNITED STATES PATENT AND TRADEMARK OFFICE
CERTIFICATE OF CORRECTION

PATENT NO. : 4,606,151

DATED : August 19, 1986

INVENTOR(S) : Erich Heynacher

It is certified that error appears in the above-identified patent and that said Letters Patent is hereby corrected as shown below:

In column 6, line 10: delete "in" and substitute -- the -- therefor.

Signed and Sealed this

Twenty-third Day of December, 1986

Attest:

DONALD J. QUIGG

*Attesting Officer*   *Commissioner of Patents and Trademarks*